United States Patent [19]

Mouret et al.

[11] 4,321,235
[45] * Mar. 23, 1982

[54] PROCESS FOR THE TREATMENT OF ALKALINE LIQUORS CONTAINING SULFATE IONS

[75] Inventors: Pierre Mouret, Bourg la Reine; Georges Lyaudet, Chilly Mazarin; Angelo Sialino, Ris Orangis; Rino Berri, Chatillon, all of France

[73] Assignee: Compagnie Generale des Matieres Nucleaires (COGEMA), Paris, France

[ * ] Notice: The portion of the term of this patent subsequent to Mar. 17, 1998, has been disclaimed.

[21] Appl. No.: 876,158

[22] Filed: Feb. 8, 1978

[30] Foreign Application Priority Data

Feb. 9, 1977 [FR] France .................................. 77 03640

[51] Int. Cl.³ ..................... C01G 43/00; C01F 11/46; C01D 7/00
[52] U.S. Cl. ......................................... 423/7; 423/15; 423/17; 423/181; 423/555
[58] Field of Search ...................... 423/7, 15, 17, 181, 423/555

[56] References Cited

U.S. PATENT DOCUMENTS

| | | | |
|---|---|---|---|
| 2,656,245 | 10/1953 | Gray et al. | 423/181 |
| 2,863,717 | 12/1958 | Kunin | 423/7 |
| 2,900,227 | 8/1959 | Dancy et al. | 423/7 |
| 2,982,605 | 5/1961 | Mouret et al. | 423/7 |
| 3,000,696 | 9/1961 | Teichmann | 423/7 |
| 3,378,336 | 4/1968 | George et al. | 423/181 |
| 3,445,201 | 5/1969 | Wheelwright | 423/7 |
| 3,497,314 | 2/1970 | Thomas | 423/181 |
| 3,961,027 | 6/1976 | Crossley | 423/7 |

FOREIGN PATENT DOCUMENTS

| | | | |
|---|---|---|---|
| 1373734 | of 1964 | France | 423/7 |
| 775415 | 5/1957 | United Kingdom | 423/7 |

*Primary Examiner*—Edward A. Miller
*Attorney, Agent, or Firm*—Ernest G. Szoke; Alexis Barron; John T. Synnestvedt

[57] ABSTRACT

Alkaline solutions containing sulfate and sodium ions such as uranium leach liquors, are treated with cationic ion exchange resins in the ammonium form to form a solution containing soluble ammonium salts and complexes; the solution is further treated to convert the soluble sulfates into insoluble sulfates and, in the case of uranium, further treating to separate the uranium by heat and/or acidification. The ammonium can be recovered and reused as ammonium carbonate to regenerate the ion exchange resin whereby sodium ions are eluted from the resin in the form of sodium carbonate which is converted to sodium hydroxide and re-cycled for use as leaching solution.

14 Claims, No Drawings

PROCESS FOR THE TREATMENT OF ALKALINE LIQUORS CONTAINING SULFATE IONS

The invention relates to a process for the treatment of an alkaline solution containing both sulfate ions and sodium ions for the sake of avoiding liquid effluents and recovering the sodium ions.

This process comprises contacting said solution with a cationic ion exchange resin in the ammonium form and, after the ion exchange has taken place, recovering the solution in which ammonium ions have been substituted for the sodium ions.

The sulfate ions are then precipitated in the form of an insoluble sulfate, particularly calcium sulfate. The sodium ions are recovered by elution from the resin.

The invention relates to a process for the treatment of an alkaline solution containing both sulfate ions and sodium ions, and more particularly sodium salts which are industrially useful. Particularly a solution of this type is constituted by the leach liquor obtained after attack or leaching of an uraniferous ore rich in sulfur compounds, particularly in the form of sulfides and/or sulfates, with a solution of sodium carbonate and/or bicarbonate in the presence of an oxidant, in order to extract uranium from the ore and to solubilize it in the liquor, particularly in the form of sodium uranyl-tricarbonate. Another solution of this type is formed by the liquid effluent obtained after separation of the uranium compounds from the above said liquor, such as by precipitation by adding sodium hydroxide to this liquor.

It is known that when the ores contain sulfur, particularly in the form of sulfides or sulfates, or both, alkaline leaching leads then to solutions rich in sodium sulfate. This content of sodium sulfate in the leach solutions represents a considerable drawback, because both of pollution and of expensive losses in reactants, such as sodium carbonate and/or bicarbonate.

In fact, it is well known that leach solutions based on sodium carbonate and/or bicarbonate are generally recycled to the leaching of other batches of ore, after the recovery therefrom of the solubilized uranium. This recycling is only possible however as long as the sulfate content does not exceed certain value. When the latter is reached the ore-treatment installations must be purged. When the ores have high contents of sulfur compounds, the losses of sodium are so high that uranium extraction processes by the alkaline route become uneconomical.

Additional sodium losses are further encountered upon having recourse to sodium hydroxide for precipitating the uranium contents from the uraniferous liquors, because only part of the added sodium hydroxide is then involved in the uranium precipitation.

In addition, the problem of the rejection of liquid effluents becomes all the more acute as the relative standards for environment protection tend to become more severe. Particularly liquid effluents containing high proportions of sulfates are often not permitted at all.

The problem of the treatment of effluents rich in sodium sulfate, under acceptable economic conditions, hence becomes pressing. The precipitation of sulfate ions in the state of insoluble barium sulfate, hence storable without serious pollution risks, cannot however be contemplated, by reason of the baryte or barium salts required for this treatment being too expensive. Precipitation of the sulfate ions, in the form of calcium sulfate, by treatment of the effluents with lime, is not satisfactory in practice because of the high stability of sodium sulfate.

It is an object of the invention to overcome these difficulties at least to a great extent, particularly to provide a treatment process applicable even to uraniferous liquors, obtained from uraniferous ores having high contents of sulfur compounds, whilst enabling at the same time both the suppression in practice of the rejection of highly polluting liquids and the recovery of the major part of the sodium unused in the course of the ore leaching and, possibly, of the precipitation of the uranium from the leach liquors with sodium hydroxide.

The process according to the invention therefore comprises
(a) contacting the starting solution with a cationic ion exchange resin in the ammonium form, and recovering the solution in which the salts and complexes previously of sodium, have been essentially converted into salts and complexes of ammonium, after the ion exchange has taken place;
(b) converting the ammonium sulfates contained in the solution obtained into insoluble sulfates, such as calcium
(c) eluting the sodium ions from the ion exchange resin with a solution of an ammonium salt, the anion of which is preferably that of the initial industrially useful sodium salts, such as a carbonate and/or bicarbonate.

In those cases where the initial solution would also contain solubilized uranium, the latter will then be separated from the solution obtained at the end of step (a), such as by precipitation by means of sodium hydroxide, prior to subjecting the solution then freed from its uranium contents to step (b) of the above defined process.

Advantageously the sulfate precipitation of step (b) is then achieved by adding calcium hydroxide to the solution.

Any strong cationic resin withstanding both carbonate-containing solutions, particularly at a pH between about 9.5 and about 10, and the corresponding alkaline solutions containing sodium hydroxide and other organic materials, if any, possibly extracted together with the uranium from the ore, can be used for running the process according to the invention.

Suitable resins are more particularly constituted by the sulfonic cationic resins. Advantageously, the polymer matrix of such strongly acid resins is formed of a styrene and divinylbenzene copolymer. They may be, either in the form of a gel without porosity, or in porous form, for example in a macro-crosslinked form with true pores of large sizes. Suitable resins, cited merely by way of example, are those marketed by the ROHM & HASS company under the designations IR-120, IR-122 and IR-124.

If, as is customary, the cationic ion exchange resin is represented simply by the formula R—NH$_4$ when in the ammonium form, one may resort to the following chemical equations to understand the transformations that the principal sodium constituents contained in the liquor undergo in the course of the ion-exchange.

$$2R\text{—}NH_4 + Na_2SO_4 \rightarrow 2R\text{—}Na + (NH_4)_2SO_4 \quad (1)$$

$$2R\text{—}NH_4 + Na_2CO_3 \rightarrow 2R\text{—}Na + (NH_4)_2CO_3 \quad (2)$$

$$R\text{—}NH_4 + NaOH \rightarrow R\text{—}Na + NH_4OH \quad (3)$$

When the treated liquor further contains uranium in the dissolved state, particularly in the form of sodium uranyl-tricarbonate, the latter undergoes the transformation which can be represented by the chemical equation below:

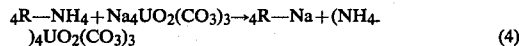
$$4R-NH_4 + Na_4UO_2(CO_3)_3 \rightarrow 4R-Na + (NH_4)_4UO_2(CO_3)_3 \quad (4)$$

Consequently it will be understood that most of the sodium initially contained in the solutions is retained on the ion exchange resin, from which it is then eluted upon recontacting the ion exchange resin with a solution of an ammonium salt. This recovery may be carried out directly in the form of sodium carbonate and/or bicarbonate, if the elution is effected with a solution of ammonium carbonate and/or bicarbonate.

The ammonium sulfate, which is much less stable than calcium sulfate, and the ammonium carbonate, and/or bicarbonate, if any still left, are easily precipitated, after separation of the possible uranium contained in the medium, by the addition of calcium hydroxide to the medium.

The ammonia released by this reaction constitutes, in a preferred embodiment of the process according to the invention, a particularly useful product for the production of ammonium carbonate which can then be used for regenerating the cationic resin, on which the sodium ions are retained, and consequently also for recovering that sodium, directly in the form of sodium carbonate and/or bicarbonate. A portion at least of these eluted solutions of sodium carbonate and/or bicarbonate may then, after concentration in an evaporator, be recycled to the leaching of new batches of uraniferous ore, under the usual conditions. Another portion of the eluted solutions of sodium carbonate can even, after making caustic by reaction with calcium hydroxide, be used for the production of a portion at least of the sodium hydroxide required for the uranium precipitation from the uraniferous extraction liquors, particularly when the process according to the invention is applied to uranium-free effluents. One can recover up to the water of the treated solution from the evaporator in which the concentration of the first mentioned portion of the eluted solution of sodium carbonate is effected.

When the process according to the invention is applied directly to an uraniferous extraction—or leach—liquor containing uranium, particularly in the form of ammonium uranyl-tricarbonate, various methods can be relied upon for recovering the uranium.

A particularly advantageous method for recovering the uranium from the solution obtained which contains the ammonium salts and/or complexes of uranium, consists of a heat treatment of the liquor, preferably at reflux temperature. The uranium is then precipitated in the form of a concentrated ammonium diuranate. This heat treatment produces also the decomposition of the ammonium carbonate into ammonia and carbon dioxide, which can be recovered for producing part of the ammonium carbonate necessary for producing the solution required for regenerating the cationic resin.

In a second type of preferred methods, the liquid containing the ammonium uranyl-tricarbonate is heated and acidified with sulfuric acid to a pH preferably of the order of 2.5 or even less, whereby the uranium compound is converted into soluble uranyl sulfate and the ammonium carbonate initially contained in the treated liquor is decomposed. The uranium sulfate can then, in a manner known per se, be precipitated by magnesia in the form of magnesium uranate. As in the preceding case, the carbon dioxide released as a result of the acidification of the medium, and the ammonia released during the conversion step of the uranyl sulfate into magnesium uranate, may be recycled to the production of ammonium carbonate, which may be used for producing a regenerating solution for the ion exchange resin.

It goes without saying that any other known process may be used for the separation of the uranium from either the still alkaline solution containing the uranium in the state of ammonium uranyl-tricarbonate, or from the acidified uranyl-sulfate solution. It is possible for example to resort to extraction processes employing organophosphorus solvents, such as di(ethylhexyl)-phosphoric acid and to recover the uranium therefrom.

The residual liquor of which ammonium sulfate then remains the essential component, can then be treated with calcium hydroxide too, under the above described conditions, to precipitate the sulfate ions in the state of insoluble calcium sulfate.

The process of the invention is advantageous whatever the components still contained in the treated uraniferous alkaline liquors.

It enables the suppression of all liquid effluents. The final degraded products, essentially calcium sulfate and carbonate, are obtained in the solid state and are easily stored.

In addition the process according to the invention permits regeneration of the expensive materials and products used (ion exchange resin and sodium carbonate) and the transformation of the side products obtained (ammonium carbonate, ammonium hydroxide, ammonia and, in certain cases, even water) into valuable products. The only products which must be supplied in relatively large amounts in the course of the treatment cycle which has been described are constituted by particularly inexpensive industrial compounds: calcium hydroxide and carbon dioxide.

The process according to the invention can be applied successfully even to uraniferous leach liquors of ores containing both sulfur compounds and organic materials which, as is well known, are particularly difficult to process. In particular, it is applicable with advantage to ores which, such as those of the Hérault area (France), have carbonates contents (essentially conventional dolomite or a ferruginous dolomite of the ankerite type), expressed as $CO_2$, from about 5 to 10% by weight and contents of organic components, from about 1 to about 5% by weight, which components comprise constituents with a more or less marked graphitic character, hydrocarbons and various organic reducing agents, among which organic acids, denoted as "humic acids" and which, by alkaline attack and oxidation, are transformed into soluble "humates".

Additional characteristics of the invention will appear also in the course of the description which follows of examples of the application of the process according to the invention.

EXAMPLE 1

Application of the process according to the invention to alkaline effluents obtained from an alkaline uranium extraction liquor from an ore, after the separation of the uranium The composition of the treated effluent is the following:

| | | |
|---|---|---|
| Na$_2$SO$_4$ | 36.4 | g/l |
| Na$_2$CO$_3$ | 17.9 | g/l |
| NaOH | 5.12 | g/l |
| U | 9 | mg/l |

The resin used was that marketed by the ROHM and HAAS company under the designation IR$_{120}$, whose capacity in milli-equivalents (meq) was in the neighbourhood of 2. The operations were carried out with a column having a volume of 34 cm$^3$, a height of 21 cm and a diameter of 1.5 cm. The effluent was percolated through the resin column, at flow rates and at temperatures indicated in the table below.

| Tests Nr. | Flow rate | Temp. in °C. | Amount of Na$^+$ retained on resin, in mg. | Value as meq | Amount of NH$_4^+$ in the liquor, in mg. | Value as meq. |
|---|---|---|---|---|---|---|
| 1 | 2.16 V/h | 20 | 1.618 | 2.07 | 1.114 | 1.82 |
| 2 | 2.08 V/h | 20 | 1.650 | 2.11 | 1.315 | 2.15 |
| 3 | 2.07 V/h | 20 | 1.603 | 2.05 | 1.537 | 2.51 |
| 4 | 2.01 V/h | 20 | 1.595 | 2.04 | .983 | 1.61 |
| 5 | 2.46 V/h | 25 | 1.708 | 2.18 | 1.215 | 1.98 |
| 6 | 1.44 V/h | 40 | 1.626 | 2.08 | 1.183 | 1.94 |
| 7 | 2.37 V/h | 40 | 1.483 | 1.79 | 1.169 | 1.91 |
| Mean | | | 1.603 | 2.05 | 1.218 | 1.99 |
| Standard deviation | | | 0.12 | | 0.283 | |

The results of this table show that an increase in temperature or a variation in the flow rate within the limits studied, do not modify the results obtained appreciably. The values in meq demonstrate that the exchange capacity of the resin is fully utilized by the process according to the invention.

By the addition to the solution of calcium hydroxide in the proportion of 100 to 400 grams per liter, the almost quantitative precipitation of the SO$_4$ and the CO$_3$ ions from the solution is produced in the state respectively of calcium sulfate and calcium carbonate.

The ions fixed on the resin were then eluted completely, as the table of results below shows. These results were obtained by causing a solution containing 70 to 150 grams of ammonium carbonate per liter to flow through the column.

TABLE II

| Tests Nr. | Elution flow rate V/h | Amount of Na$^+$ eluated | milliequivalents |
|---|---|---|---|
| 1 | 1.05 | 1.673 | 2.14 |
| 2 | 1.09 | 1.692 | 2.16 |
| 3 | 2.58 | 1.728 | 2.21 |
| 4 | 1.79 | 1.723 | 2.20 |
| 5 | 2.01 | 1.722 | 2.20 |
| 6 | 1.52 | 1.720 | 2.20 |
| 7 | 2.03 | 1.747 | 2.33 |
| Mean | | 1.715 | 2.19 |
| Standard deviation | | | 0.031 |

It is observed that the loading capacity of the column in ammonium ions was even shown to be slightly higher than the value stated by the manufacturer. Similarly, the flow rate, which corresponds to a flow rate of the solution which can reach 2.5 volumes of resin per hour, does not very much influence the regeneration capacity of the resin.

EXAMPLE 2

Treatment of a uraniferous liquor

The treated liquor had the following composition:

| | |
|---|---|
| Na$_2$SO$_4$ | 40.1 g/l |
| Na$_2$CO$_3$ | 4.93 g/l |
| NaHCO$_3$ | 7.47 g/l |
| Na$_4$UO$_2$(CO$_3$)$_3$ | 5.76 g/l, namely U = 2.53 g/l |
| Mo in the form of molybdates | 130 ppm |

The resin used was the same as in the preceding example. It had particle sizes ranging from 297 to 1190 microns. It was used in a volume of 92 cm$^3$, in a column whose height was 13 cm and diameter 3 cm.

The ion exchange was carried out as in the preceding example and the results are expressed in table III hereafter.

The results show that the loading capacity of the resin in sodium ions was not altered by the presence of uranium. The residual uranium content of the resin was 11 mg per liter, which represents 0.06% of the amount of uranium which has circulated. The molybdenum was not fixed.

The uranium contained in the eluted solution was then separated by heating and refluxing the solution for from 1 to 4 hours, whereby most of the uranium was precipitated from the liquor in the form of ammonium diuranate.

The residual liquor was then treated according to the procedure of the preceding example, to effect the precipitation of the residual sulfates and carbonates in the state of calcium sulfates and carbonates.

As in the preceding case, the resin was regenerated by eluting it with a solution containing about 100 g per liter of ammonium carbonate. A solution of sodium carbonate was obtained which, after evaporation up to a concentration from 50 to 100 grams of sodium carbonate per liter, provided part of the leaching solution for fresh charges of uraniferous ore.

TABLE III

| Nr. | Flow rate | Contents (mg per l.) | | |
|---|---|---|---|---|
| | | Na in the liquor | U on the resin | Mo on the resin |
| 1 | 0.65 | 12.800 | 7 | traces |
| 2 | 1.25 | 21.900 | 5 | " |
| 3 | 1.81 | 28.00 | 4 | " |
| 4 | 2.35 | 16.400 | 4 | " |
| 5 | 2.89 | 8.550 | 1 | " |
| 6 | 3.41 | 3.730 | 1 | " |
| 7 | 3.91 | 1.560 | <1 | " |
| 8 | 4.40 | 780 | <1 | " |
| 9 | 4.89 | 330 | <1 | " |
| 10 | 5.39 | 140 | <1 | " |
| 11 | 5.89 | 90 | <1 | " |

TABLE III-continued

| Nr. | Flow rate | Contents (mg per 1.) | | |
|---|---|---|---|---|
| | | Na in the liquor | U on the resin | Mo on the resin |
| 12 | 6.32 | 80 | <1 | " |

We claim:

1. Process for removing sulfate ions in solid form and separately recovering sodium ions from an alkaline solution containing both sulfate ions and sodium ions which comprises:
   (a) contacting said alkaline solution with a cation exchange resin initially in the ammonium form to effect ion exchange between the sodium ions of said alkaline solution and the ammonium ions of said cation exchange resin, and recovering, after the ion exchange has been effected, a solution containing sulfate ions and ammonium ions, said sodium ions being retained on said cation exchange resin;
   (b) treating said solution containing sulfate ions and ammonium ions with calcium in a soluble form to precipitate the sulfate ions as insoluble calcium sulfate; and,
   (c) eluting the sodium ions retained on the cation exchange resin, with a solution of an ammonium salt, other than a sulfate, whereby the cation exchange resin is regenerated and the sodium ions are recovered in the form of a sodium salt, other than a sulfate.

2. The process of claim 1 wherein the starting alkaline solution contains carbonates or bicarbonates of sodium or both.

3. The process of claim 2 wherein the starting alkaline solution is a liquid effluent obtained from an alkaline leach liquor of an uraniferous ore after separation therefrom of uranium extracted from the ore by precipitation with sodium hydroxide.

4. The process of claim 1 wherein the starting alkaline solution is an alkaline liquor containing uranium obtained from the alkaline leaching of an uraniferous ore and which comprises the additional step of selectively separating uranium from the solution containing sulfate ions and ammonium ions obtained in step (a), prior to treating with calcium in a soluble form to precipitate the sulfate ions as insoluble calcium sulfate.

5. The process of any one of claims 1 to 4 wherein the conversion of said ammonium sulfate into insoluble calcium sulfate in step (b) comprises reacting the solution containing ammonium ions and sulfate ions with calcium hydroxide.

6. The process of claim 5 wherein the solution of an ammonium salt used in step (c) to elute the sodium ions retained on the cation exchange resin is a solution containing carbonate or bicarbonate of ammonium or both.

7. The process of claim 6 wherein the cation exchange resin is a sulfonic cation exchange resin.

8. In a process for extracting uranium from uraniferous ores containing sulfides or sulfates, or both, by leaching said ores with an alkaline leaching solution containing sodium carbonate or bicarbonate, or both, in the presence of an oxidant to form a leaching solution containing extracted uranium, the improvement which comprises contacting the leaching solution containing extracted uranium with a cation exchange resin in the ammonium form to effect ion exchange between the sodium ions of said alkaline solution and the ammonium ions of said cation exchange resin, and recovering, after the ion exchange has been effected, a solution in which ammonium ions have been substituted for the sodium ions, separating the uranium from the solution obtained by (a) heat treatment of the solution to cause precipitation of the uranium in the form of an hydrated oxide and the decomposition of the ammonium carbonate contained in said solution; or (b) heating and acidifying the solution with sulfuric acid to transform the uranium content of the solution into soluble uranyl sulfate and thereafter precipitating the uranium in the form of magnesium uranate by the addition of magnesia to the solution of uranyl sulfate, and thereafter converting the ammonium sulfate in the solution freed from the uranium into an insoluble calcium sulfate, eluting the sodium ions from the cation exchange resin with a solution containing ammonium carbonate or bicarbonate, or both, concentrating part at least of the sodium carbonate or bicarbonate solution and recycling said concentrated carbonate or bicarbonate solution into the alkaline leaching solution for the treatment of fresh uranium ore.

9. The process of claim 8 wherein the step of separating the uranium from the solution obtained comprises heating the solution to cause precipitation of the uranium in the form of an hydrated oxide and the decomposition of the ammonium carbonate contained in said solution, recovering the released ammonia and transforming it into a solution of ammonium carbonate, the so formed ammonium carbonate solution forming at least part of a solution of ammonium salt which is used for regenerating the cation exchange resin to convert it back to the ammonium form.

10. The process of claim 8, wherein the step of separating the uranium from the solution obtained comprises heating and acidifying the solution with sulfuric acid to transform the uranium contents of the solution into soluble uranyl sulfate, and thereafter precipitating the uranium in the form of magnesium uranate by the addition of magnesia to the solution of uranyl sulfate, recovering the ammonia formed in acidifying with sulfuric acid and in adding magnesia to the solution of uranyl sulfate, and transforming said ammonia into a solution of ammonium carbonate, the so formed ammonium carbonate solution forming at least part of a solution of ammonium salt which is used for regenerating the cation exchange resin to convert it back to the ammonium form.

11. The process of any one of claims 9 and 10 which comprises reacting part of the solution of sodium carbonate eluted from the cation exchange resin with calcium hydroxide to produce sodium hydroxide which is recycled into the solution of sodium hydroxide used for separating the uranium from the leaching solution containing extracted uranium.

12. Process for removing sulfate ions in solid form and separately recovering sodium ions from an alkaline solution containing both sulfate ions and sodium ions which comprises:
   (a) contacting said alkaline solution with a cation exchange resin initially in the ammonium form to effect ion exchange between the sodium ions of said alkaline solution and the ammonium ions of said cation exchange resin, and recovering, after the ion exchange has been effected, a solution containing sulfate ions and ammonium ions, said sodium ions being retained on said cation exchange resin;

(b) treating said solution containing sulfate ions and ammonium ions with calcium hydroxide to precipitate the sulfate ions as insoluble calcium sulfate; and, (c) eluting the sodium ions retained on the cation exchange resin, with a solution of ammonium carbonate, bicarbonate, or both, whereby the cation exchange resin is regenerated and the sodium ions are recovered in the form of sodium carbonate, bicarbonate, or both.

13. In a process for extracting uranium from uraniferous ore containing sulfides or sulfates, or both, by leaching said ores with an alkaline leaching solution containing sodium carbonates or bicarbonates, or both, in the presence of an oxidant to form a leaching solution containing extracted uranium, the improvement which comprises contacting the leaching solution containing extracted uranium with a cation exchange resin in the ammonium form to effect ion exchange between the sodium ions in said alkaline leaching solution and the ammonium ions of said cation exchange resin and recovering after the ion exchange has been effected a solution containing sulfate ions and ammonium ions, said sodium ions being retained on said ion exchange resin; selectively separating uranium from the solution containing sulfate ions and ammonium ions; and thereafter, treating said solution containing sulfate ions and ammonium ions with calcium hydroxide to precipitate the sulfate ions as insoluble calcium sulfate and, thereafter, eluting the sodium ions retained on the ion exchange resin with a solution of an ammonium salt, other than a sulfate, whereby the cation exchange resin is regenerated and the sodium ions are recovered in the form of a sodium salt, other than a sulfate.

14. A process in accordance with claim 13 wherein the solution of an ammonium salt is a solution of ammonium carbonate, bicarbonate, or both.

* * * * *